United States Patent [19]

Anzai et al.

[11] Patent Number: 4,469,088
[45] Date of Patent: Sep. 4, 1984

[54] SOLAR COLLECTOR

[75] Inventors: Shunichi Anzai, Hitachi; Takeshi Sakamoto, Ibaraki, both of Japan

[73] Assignee: The Agency of Industrial Science and Technology, Tokyo, Japan

[21] Appl. No.: 352,153

[22] Filed: Feb. 25, 1982

[30] Foreign Application Priority Data

Mar. 6, 1981 [JP] Japan .................... 56-31138

[51] Int. Cl.³ ............................. F24J 3/02
[52] U.S. Cl. .................... 126/436; 126/438; 126/443; 126/449; 126/400
[58] Field of Search .............. 126/436, 438, 443, 400, 126/449; 165/10, 104.17

[56] References Cited

U.S. PATENT DOCUMENTS

| | | | |
|---|---|---|---|
| 3,954,097 | 5/1976 | Wilson | 126/438 |
| 4,200,148 | 4/1980 | Friefeld et al. | 126/436 X |
| 4,223,666 | 9/1980 | Wasserman | 126/400 X |
| 4,250,866 | 2/1981 | Telkes | 126/400 X |
| 4,250,958 | 2/1981 | Wasserman | 126/436 X |
| 4,335,706 | 6/1982 | Passarelli et al. | 126/400 X |
| 4,340,035 | 7/1982 | Begun | 126/438 |

Primary Examiner—Samuel Scott
Assistant Examiner—Margaret A. Focarino
Attorney, Agent, or Firm—Birch, Stewart, Kolasch & Birch

[57] ABSTRACT

The present invention relates to a solar collector for obtaining high temperature thermal energy by collecting solar energy, especially to the improvement of performance and safety of an absorber tube containing thermal energy storage material. Precisely, the solar collector has a double tube structure at the focal line of a solar concentrator where thermal energy storage material changeable from a solid phase to a liquid phase is enclosed in the space between the inner tube and the outer tube, heat transfer fluid is introduced through the inner tube and the outer surface of the inner tube and the inner surface of the outer tube have partial contact with each other. Consequently, in accordance with the present invention, a part of the absorbed solar energy is transferred directly to the inner tube without passing through the thermal energy storage material and heats the heat transfer fluid efficiently because of the direct contact of the inner and outer tubes.

2 Claims, 5 Drawing Figures

SOLAR COLLECTOR

TECHNICAL FIELD

The present invention relates to a solar collector for obtaining high temperature thermal energy by collecting solar energy, especially to the improvement of performance and safety of an absorber tube containing thermal energy storage material.

BACKGROUND ART

To obtain high temperature thermal energy, by collecting solar energy, there are a parabolic trough system, a lens system and a central receiver system using a plural number of heliostats. The parabolic trough system is taken for example of the conventional art hereinafter. A common structure of the parabolic trough system is shown in FIG. 1, where 1 indicates a parabolic trough mirror, 3 indicates an absorber tube arranged at the focal line of the parabolic trough mirror 1.

In the absorber tube 3, heat transfer fluid 5, for example, water, liquid natrium, or carbon dioxide gas is introduced and said parabolic trough solar collector is oriented toward the sun. Solar energy 6 is reflected by the parabolic trough mirror 1 and collected at the absorber tube 3 arranged at the focal line of said mirror 1, and the heat transfer fluid 5 is heated to high temperature. Even though a solar collector requires no fuel, it is naturally important to manufacture compact solar collectors at a low cost. For this purpose, it is necessary to develop solar collectors with high collector efficiency. In order to improve collector efficiency, two means are taken; one means is to transmit solar energy to the absorber tube 3 as much as possible by improving reflectivity of the parabolic trough mirror 1, the other means is to decrease energy loss from the absorber tube 3 by covering the absorber tube 3 with glass tube 2 as shown in FIG. 1, and evacuating the space 4 between the absorber tube 3 and the glass tube 2 to decrease the convection heat loss discharged to the outer air from the absorber tube 3. Moreover, in order to increase solar energy absorption and, at the same time, to decrease emission from the absorber tube 3, a special film (which is generally called selective transparent film) with high visible radiation transmittance and high infrared radiation reflectivity is applied to the glass tube 2, or the surface of the absorber tube 3 is coated with special film (which is generally called a selective surface) with high visible radiation absorptance and low infrared radiation omittance.

A structure of a solar collector system has been described using an example, the parabolic trough system described above. A detailed description can be omitted for the lens system with use of convex lens or Fresnel lens and the central receiver system with a plural number of heliostats to collect solar energy by an absorber tube or by a group of absorber tubes arranged at the focal line, because they are all basically of the same structure as that of said parabolic trough system.

Solar energy obtainable on the ground changes abruptly depending on the weather and high temperature concentrating type solar collectors are subjected to abrupt thermal change (temperature change). That is, when the sun is covered with clouds temporarily, the high heat flux density of the concentrating type solar collector rapidly drops down to zero, and, when the sun appears again, the high heat flux density is instantly recovered. It is very hard to control the heat transfer fluid flow rate according to the flux of solar radiation. Therefore, in such a case, the temperature of the absorber tube 3 repeatedly falls down to the supply temperature of heat transfer fluid and rises extremely high, and an abrupt thermal shock sometimes damages the absorber tube 3. In addition, a burn-out phenomenon of heat transfer fluid 5 breaks the absorber tube 3. For the purpose of removing these defects of the concentrating type solar collector, a method shown in FIG. 2 is conventionally designed (Author: Raymond K. Burns, Report No. NASA TN D-6266: Preliminary Thermal Performance Analysis of the Solar Brayton Heat Receiver). In FIG. 2, 21 indicates an absorber tube with constrictions 23 in some portions thereof, 22 is a cover bellows, element 13 indicates a thermal energy storage material which is a changeable phase and enclosed between the absorber tube 21 and the cover bellows 22. An adequate material for thermal energy storage material 13 having a melting point close to a desirable absorbing temperature is chosen among molten salts consisting of single component or multicomponent mixtures as listed in Table 1. The thermal energy storage material 13 is molten by absorbed solar energy, which is temporarily stored by its heat of function.

TABLE 1

| Molten Salt Composition | Composing Ratio (mol %) | Melting Point (°C.) | Heat of Fusion (kcal/kg) |
|---|---|---|---|
| NaOH | 100 | 318 | 76.0 |
| KCl-LiCl | 41.5–58.5 | 361 | 57.25 |
| NaCl-MgCl$_2$ | 52–48 | 450 | 77 |
| NaCl-CaCl$_2$ | 48–52 | 500 | 44 |
| NaCl-KCl | 50–50 | 658 | 91 |
| LiF | 100 | 848 | 246 |

In case that there is no abrupt change in solar radiation, solar energy is transferred to the cover bellows 22, molten thermal energy storage material 13 and the absorber tube 21 and the heat transfer fluid 5 is heated. The effect of this structure is witnessed in the abrupt change of solar radiation. When the intensity of solar radiation decreases rapidly, the energy quantity absorbed also drops down rapidly, but the heat of fusion of thermal energy storage material can heat the heat transfer fluid 5 and, by decreasing gradually the flow rate of the heat transfer fluid 5, abrupt thermal change is prevented. When the intensity of solar radiation is recovered, the energy quantity absorption increases rapidly, but the temperature of the absorber tube does not rise instantly because the energy quantity is absorbed as heat of fusion of the thermal energy storage material 13. The cover bellows 22 is made in bellows shape and the absorber tube 21 has constrictions 23 for the purpose of absorbing their thermal expansion and volume change of thermal energy storage material 13.

Such a conventional solar collector has the defect that the collector efficiency lowers in order to increase radiation loss and difficulty in processing selective surface raises the cost of the solar collector. The collected thermal energy which has reached the cover bellows 22 is conducted through the thermal energy storage material 13 and transferred to the heat transfer fluid 5 through the absorber tube 21. Accordingly, the heat conductive resistance of the thermal energy storage material 13 increases and its heat transfer performance is inferior to that of the structure without thermal energy storage material shown in FIG. 1. In addition, if the temperature of heat transfer fluid is set at the same temperature, surface temperature of the cover bellows 22 must be heated to considerably higher than the surface temperature of the absorber tube 3. As is clear from FIG. 2, the cover bellows 22 is in bellows shape which makes the surface dimension extremely large. It is known that the radiation heat loss is proportional to the fourth power of its absolute temperature and proportional to its dimension. Consequently, this conventional embodiment has the defects that radiant heat loss increases and the solar collector efficiency decreases.

OBJECT OF THE INVENTION

The object of the present invention is to offer a solar collector of thermal energy storage material contained type with a high collector efficiency.

SUMMARY OF THE INVENTION

The principal point of this invention is to improve heat transfer performance by arranging a thin fluted tube inside the adsorber tube in such a way that some portions of the thin fluted tube contact with the inner surface of the absorber tube to attain the above object.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT OF THE INVENTION

Figure 1:
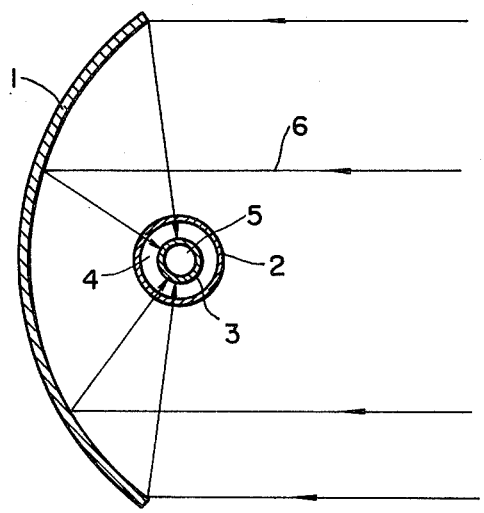
FIG. 1 shows a common structure of a solar collector with a parabolic trough system.
Figure 2:
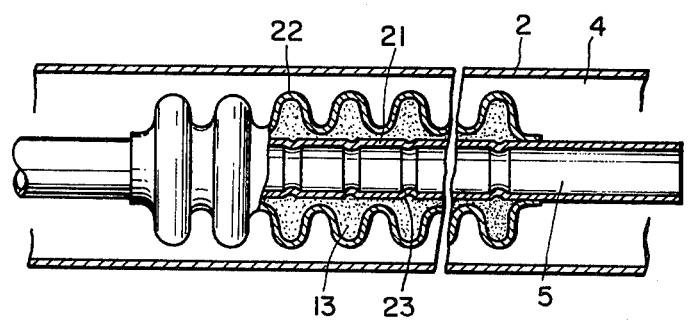
FIG. 2 is a cross-sectional view of the conventional absorber portion containing a thermal energy storage material.
Figure 3:
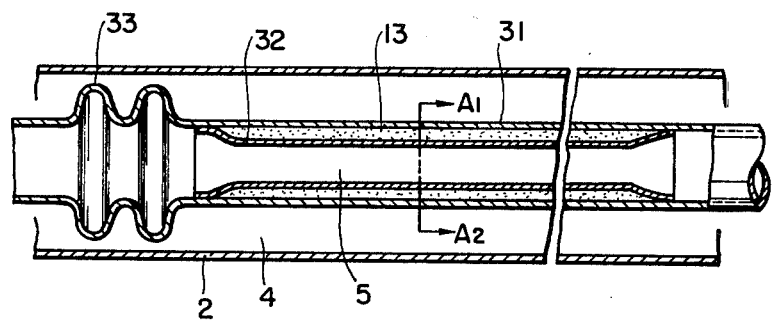
FIG. 3 is a cross-sectional view of an absorber portion containing thermal energy storage material in accordance with the present invention.
Figure 4:
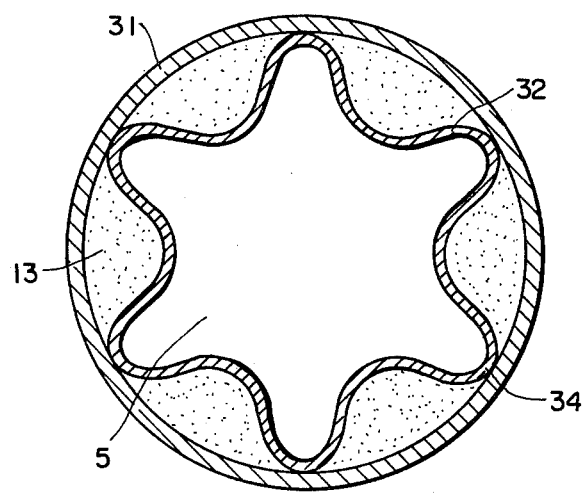
FIG. 4 is cross-sectional view along $A_1-A_2$ line of FIG. 3.

The embodiment of the invention will be described with reference to FIG. 3 and FIG. 4. FIG. 3 shows longitudinal cross-sectional view of the solar collector containing thermal energy storage material in accordance with the invention, and FIG. 4 shows a cross-section along $A_1-A_2$ line of FIG. 3. The parts which are the same as conventional elements are indicated with the same numbers. Element 31 indicates an absorber tube, and element 32 is a fluted tube having a wavelike form in its circumference which is inserted in the absorber portion of the absorber tube 31. The fluted tube 32 is a thin tube and the tops of the waves 34 contact with the inner surface of the absorber tube, and a thermal energy storage material 13, which is a solid changeable in the liquid phase is filled in the space between the absorber tube 31 and the fluted tube 32. Both ends of the fluted tube 32 are welded to the absorber tube 31 and the thermal energy storage material is enclosed therebetween. Element 33 is bellows to absorb thermal expansion of the absorber tube 31 and the fluted tube 32.

In the solar collector of the present invention, a part of the solar energy which reaches the absorber tube 31 is directly transferred to the thermal energy storage material 13 and another part of solar energy is transferred to heat transfer fluid 5 and thermal energy storage material 13 through the fluted tube 32 having contact with the absorber tube 31 which melts the thermal energy storage material 13 to store thermal energy. Fluted tube 32 plays a role of a container of thermal energy storage material 13 and also as a fin to transmit absorbed solar energy from absorber tube 31 to thermal energy storage material 13 and heat transfer fluid 5. During normal time when there is no change of solar radiation, collected solar energy passes through molten thermal energy storage material 13 and the fluted tube 32 and is transferred to the heat transfer fluid 5. When the collected thermal energy quantity decreases rapidly by abrupt weather change, heat transfer fluid 5 is heated by the heat of fusion of the thermal energy storage material 13, and, when the enough intensity of the solar radiation is recovered, the collected thermal energy can be absorbed as heat of fusion of thermal energy storage material 13 to prevent drastic change of the collector temperature. Volume change caused by solid-liquid phase change of thermal energy storage material 13 can be absorbed by distortion of the thin fluted tube 32. Thermal expansion caused by increased temperature of the absorber tube is absorbed by bellows 33. The pressure of the heat transfer fluid 5 is not held with the fluted tube 32 but by the absorber tube 31.

The embodiment of the present invention has the following effects: The temperature of the absorber tube 31 can be kept lower than that of the conventional embodiment by fin effect of the fluted tube 32, and, moreover, the outer heat transfer area is smaller than that of the conventional embodiment because a straight tube is adopted as an absorber tube 31. As mentioned in the description of the conventional embodiment, radiation loss from the absorber tube (there is little convection heat loss in a vacuum.) is proportional to the fourth power of its absolute temperature and to its dimension. Accordingly, radiation loss being small in the embodiment of the invention, solar collector efficiency can be raised much higher than that of the conventional one. As the absorber tube is in simple smooth tube shape, the coating process of a selective surface which is formed by plasma-jet coating $Cr_2O_3$ onto the outer surface of the absorber tube, in uniform thickness, is considerably easy and a selective surface can thus be made at low cost and with good accuracy. Though it is not shown in FIG. 3 and FIG. 4, convection heat transfer of heat transfer fluid can be improved to raise heat transfer performance of the solar collector by applying a twisted tube for a fluted tube 32.

Figure 5:
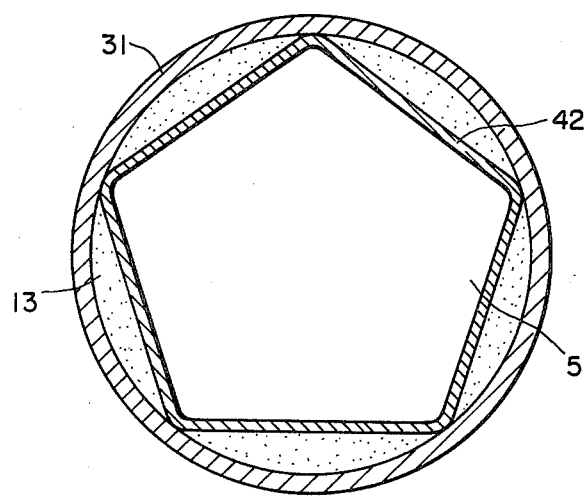
FIG. 5 shows another embodiment of the present invention.

One embodiment of the invention has been described above and other applied embodiments are conceivable within the ideas of the invention. FIG. 5 is cross-sectional view of a solar collector using another applied embodiment of the present invention. This embodiment is different from the one in FIG. 3 in that a thin angulated tube 42 is adopted as an absorber tube 32, but the layout and functions of each component of the apparatus are the same as those mentioned in the above description. With this embodiment, the same effects can be expected.

A parabolic trough system was taken for example in the description, but it is of course possible to execute this invention in absorber portions of other receiver systems such as a lens receiver system or a central receiver system.

In accordance with the invention, a part of the collected solar energy can be transferred to the inner tube without passing through the thermal energy storage material because the inner tube and the outer tube have part contact with each other so that the heat transfer fluid is heated efficiently.

What is claimed is:

1. A solar collector comprising:
   a double tube comprising a round and straight outer tube, and a fluted inner tube having a wave-like cross-sectional configuration and coaxially disposed within said outer tube, the wall thickness of said outer and inner tubes being uniform over their length and the apexes of the wave-like form cross-section of said inner tube contacting the inner surface of said outer tube,
   a thermal energy storage material changeable from a solid to a liquid phase being enclosed in the space between said outer and inner tubes,
   a heat transfer fluid flowing through said inner tube,
   a round, straight and transparent tube coaxially disposed around said double tube, the space between said double tube and transparent tube being evacuated, and
   a reflector mounted to locate the focal axis of said reflector on the axis of said double tube.

2. A solar collector comprising:
   a double tube comprising a round and straight outer tube, and an angulated inner tube having a polygonal cross-sectional configuration and coaxially disposed within said outer tube, the wall thickness of said outer and inner tubes being uniform over their length and the corners of the polygonal cross-section of said inner tube contacting the inner surface of said outer tube,
   a thermal energy storage material changeable from a solid to a liquid phase being enclosed in the space between said outer and inner tubes,
   a heat transfer fluid flowing through said inner tube,
   a round, straight and transparent tube coaxially disposed around said double tube, the space between said double tube and transparent tube being evacuated, and
   a reflector mounted to locate the focal axis of said reflector on the axis of said double tube.

* * * * *